(12) United States Patent
Bang et al.

(10) Patent No.: US 7,025,365 B2
(45) Date of Patent: Apr. 11, 2006

(54) ELEVATABLE AND EXTENDABLE PLATFORM

(75) Inventors: Gary M. Bang, Chandler, AZ (US); Dan Knodle, Seattle, WA (US)

(73) Assignee: OT LLC, Seattle, WA (US)

( * ) Notice: Subject to any disclaimer, the term of this patent is extended or adjusted under 35 U.S.C. 154(b) by 255 days.

(21) Appl. No.: 10/354,588

(22) Filed: Jan. 30, 2003

(65) Prior Publication Data

US 2004/0150184 A1 Aug. 5, 2004

(51) Int. Cl.
*B60R 3/00* (2006.01)

(52) U.S. Cl. .................... 280/166; 280/163; 280/164.1
(58) Field of Classification Search ............. 280/163, 280/166, 164.1, 164.2; 182/82, 88, 91, 95, 182/96, 127, 166, 19; 248/421, 565; 108/106, 108/107
See application file for complete search history.

(56) References Cited

U.S. PATENT DOCUMENTS

| | | | | | |
|---|---|---|---|---|---|
| 1,862,010 | A | * | 1/1932 | Ehrlich | 294/144 |
| 3,488,066 | A | * | 1/1970 | Hansen | 280/163 |
| 3,758,134 | A | * | 9/1973 | Stewart | 280/163 |
| 3,955,827 | A | * | 5/1976 | Wonigar | 280/166 |
| 3,961,809 | A | | 6/1976 | Clugston | 280/166 |
| 3,981,515 | A | | 9/1976 | Rosborough | 280/166 |
| 4,020,920 | A | * | 5/1977 | Abbott | 182/19 |
| 4,029,223 | A | * | 6/1977 | Adamski et al. | 414/546 |
| 4,073,502 | A | * | 2/1978 | Frank et al. | 280/166 |
| 4,108,457 | A | * | 8/1978 | Garrett | 280/166 |
| 4,180,143 | A | * | 12/1979 | Clugston | 182/91 |
| 4,249,634 | A | * | 2/1981 | Potts | 182/1 |
| 4,524,475 | A | * | 6/1985 | Valentino | 5/507.1 |
| 4,558,648 | A | * | 12/1985 | Franklin et al. | 108/147 |
| 4,623,160 | A | * | 11/1986 | Trudell | 280/166 |
| 4,720,116 | A | * | 1/1988 | Williams et al. | 280/166 |
| 5,005,667 | A | * | 4/1991 | Anderson | 182/15 |
| 5,005,894 | A | * | 4/1991 | Nagata | 296/68.1 |
| 5,039,119 | A | * | 8/1991 | Baughman | 280/166 |
| 5,341,897 | A | * | 8/1994 | Gross | 182/88 |
| 5,547,040 | A | * | 8/1996 | Hanser et al. | 182/88 |
| 5,897,125 | A | | 4/1999 | Bundy | |
| 5,941,342 | A | * | 8/1999 | Lee | 182/95 |
| 5,944,332 | A | * | 8/1999 | Lee et al. | 280/163 |
| 5,957,237 | A | * | 9/1999 | Tigner | 182/127 |
| 6,170,843 | B1 | * | 1/2001 | Maxwell et al. | 280/166 |
| 6,193,297 | B1 | * | 2/2001 | Vandermolen | 296/68.1 |
| 6,213,486 | B1 | | 4/2001 | Kunz et al. | |
| 6,325,397 | B1 | | 12/2001 | Pascoe et al. | |
| 6,439,635 | B1 | * | 8/2002 | Hardy et al. | 296/65.01 |
| 6,685,204 | B1 | * | 2/2004 | Hehr | 280/166 |

* cited by examiner

*Primary Examiner*—Christopher P. Ellis
*Assistant Examiner*—Kelly E Campbell
(74) *Attorney, Agent, or Firm*—Jensen & Puntigam PS

(57) ABSTRACT

A stowable platform for use with a vehicle movable from the stowed to the extended position in a single plane. Once extended, the platform support is locked, preventing further movement, and the platform itself is capable of further extension or elevation.

7 Claims, 14 Drawing Sheets

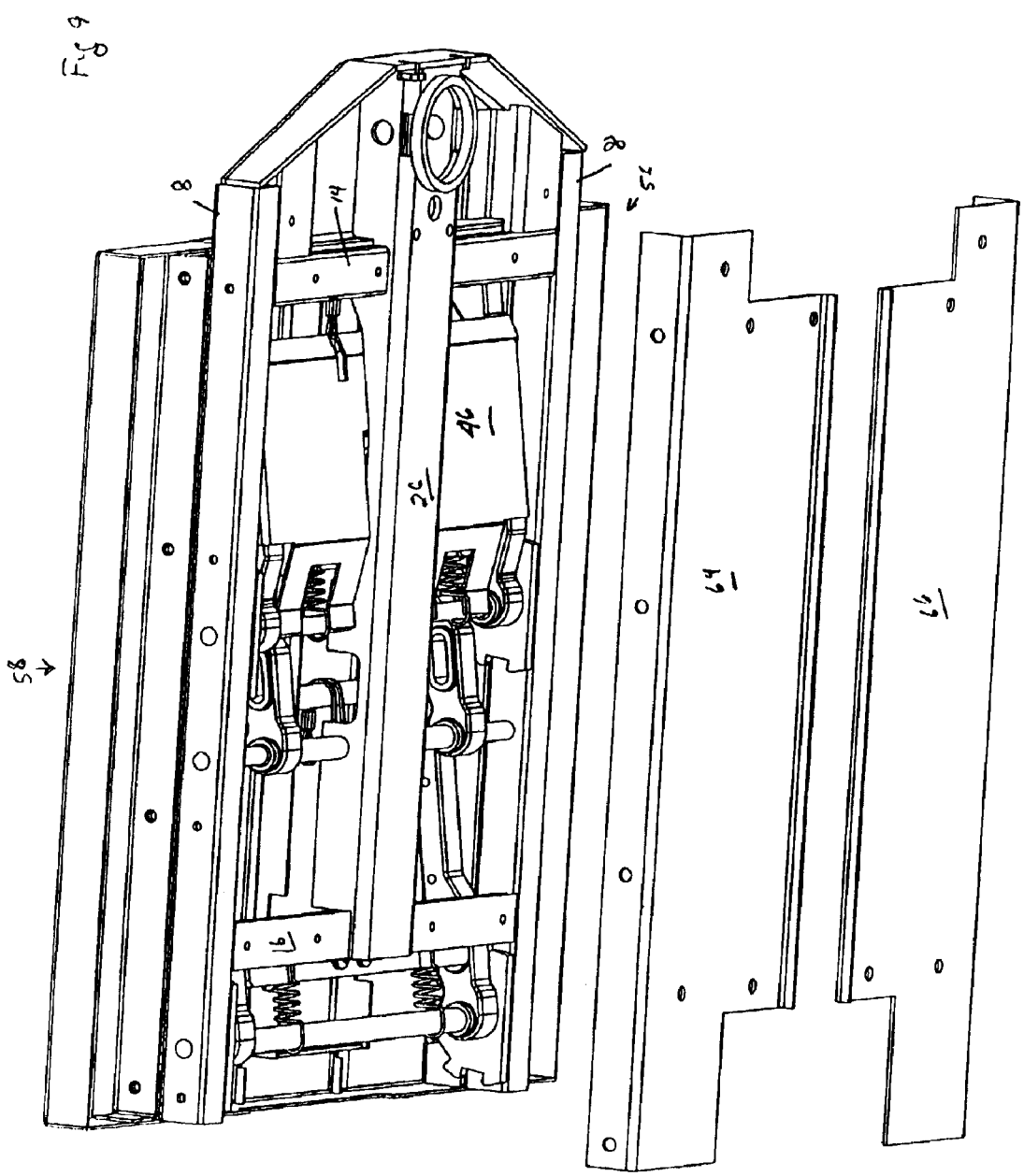

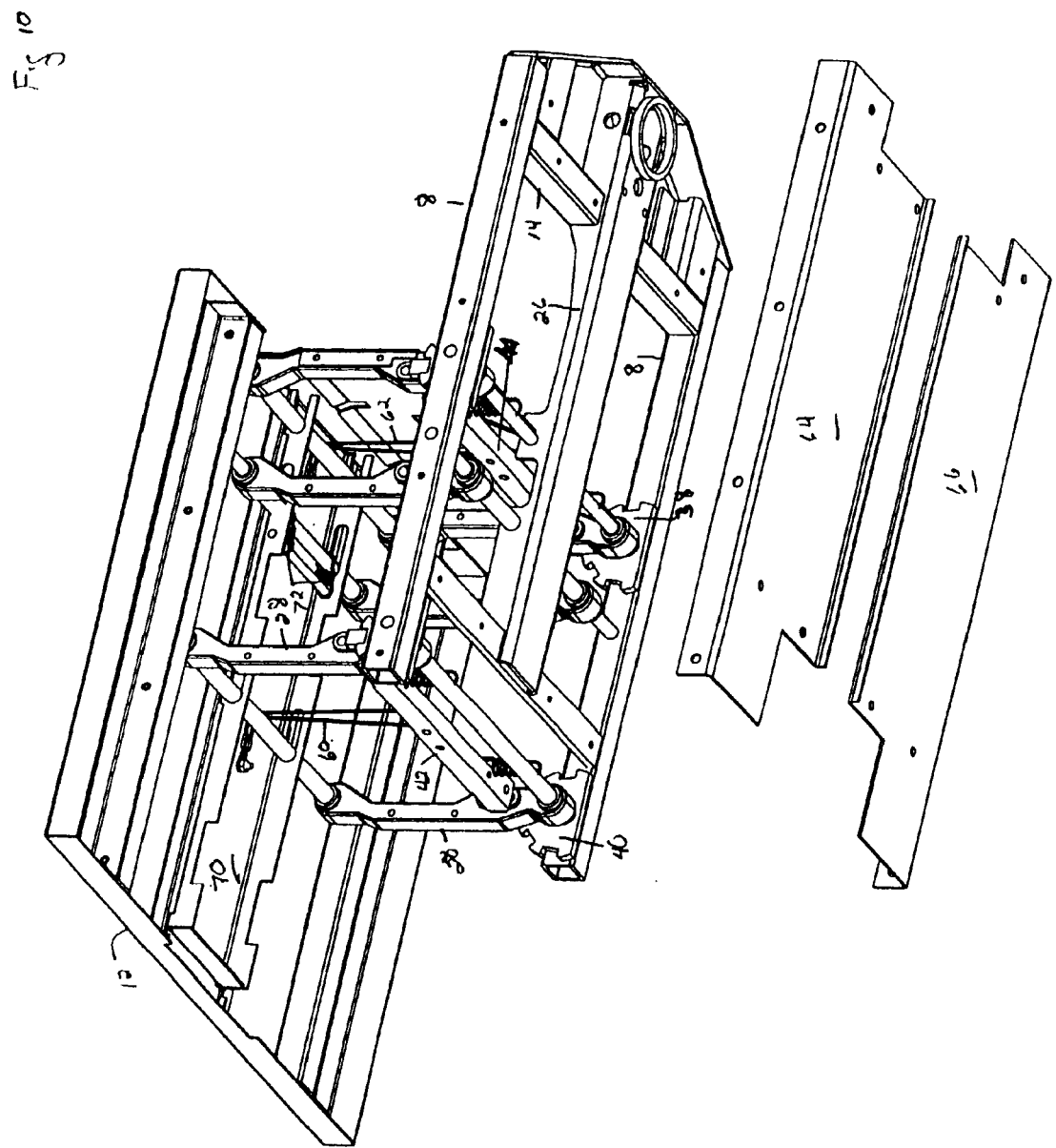

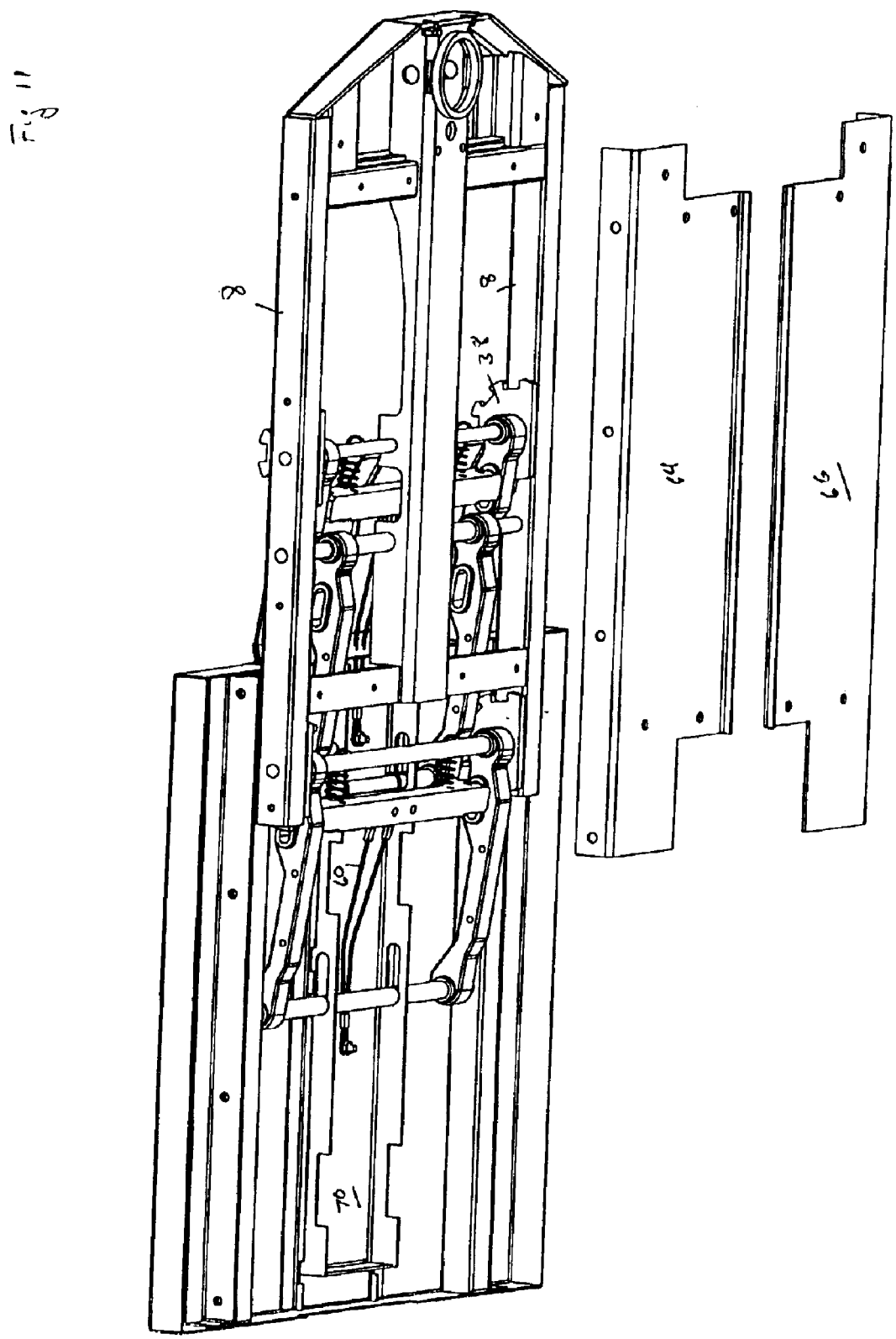

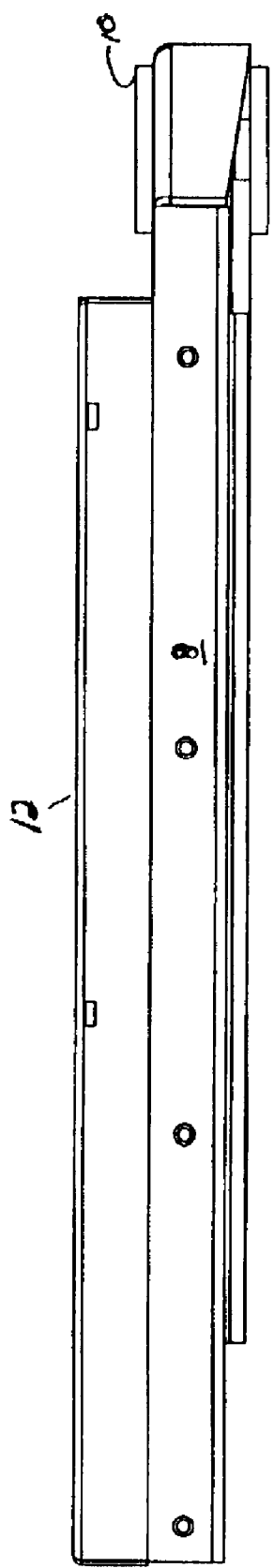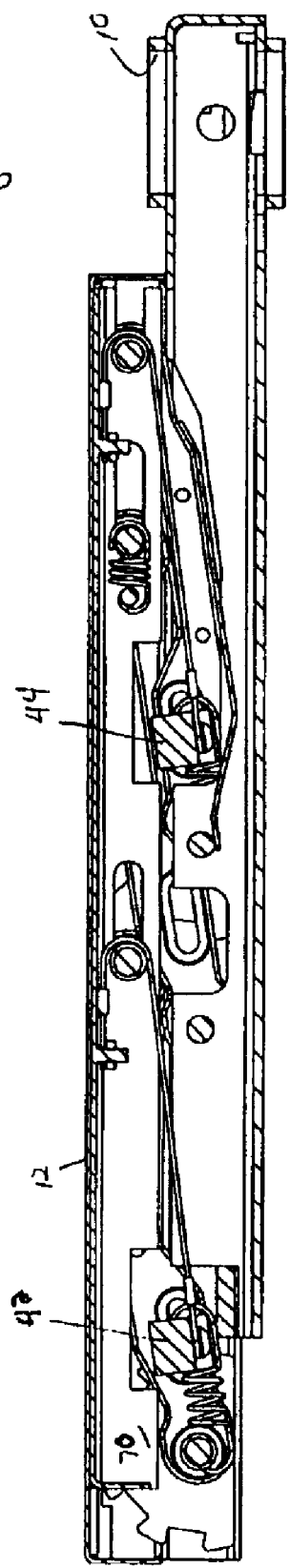

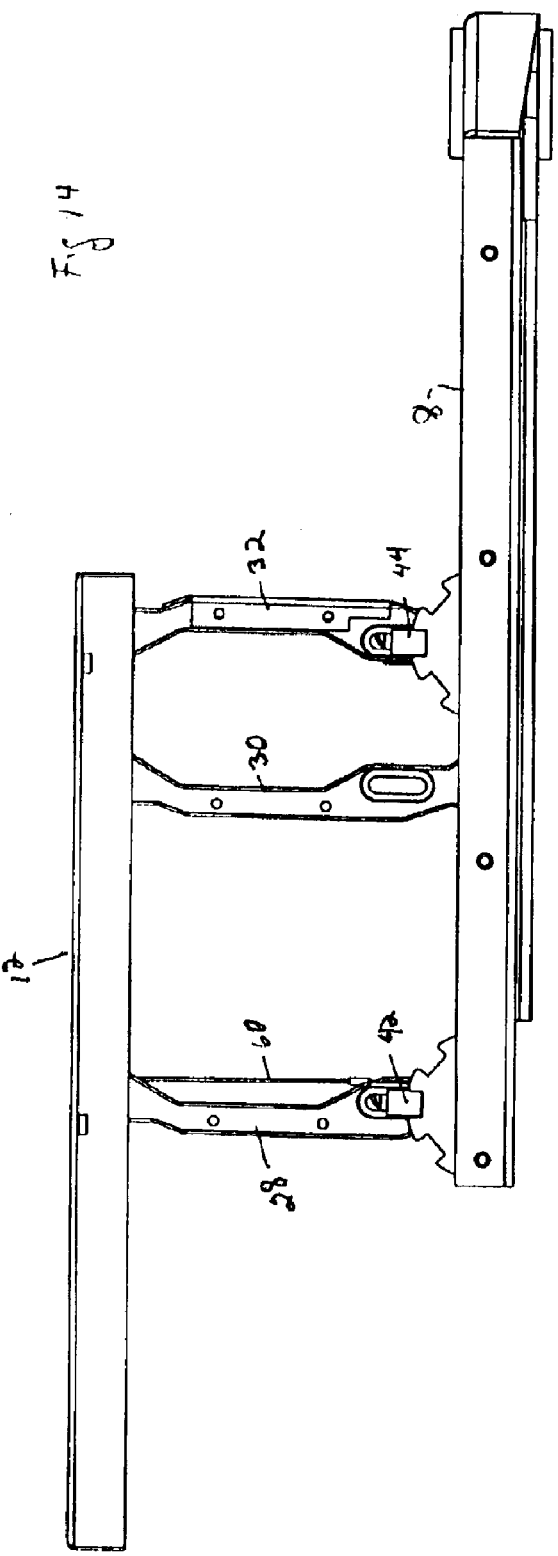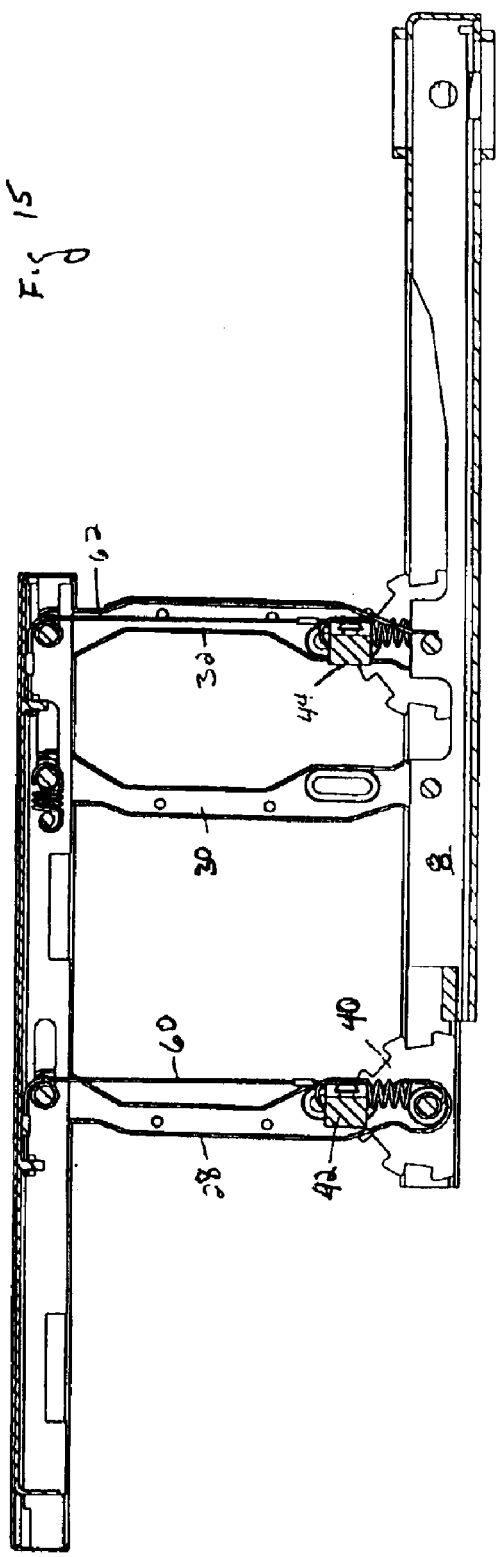

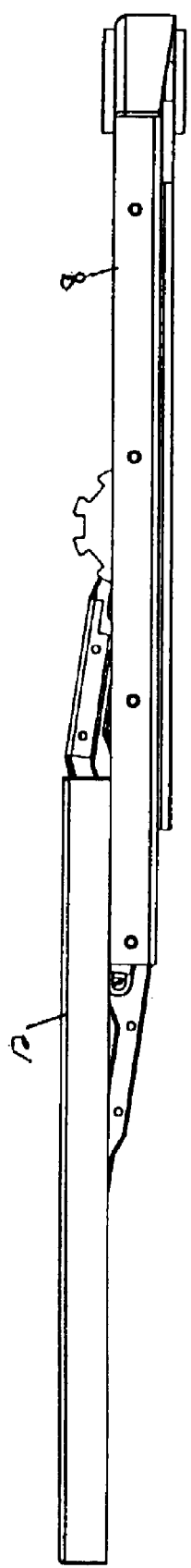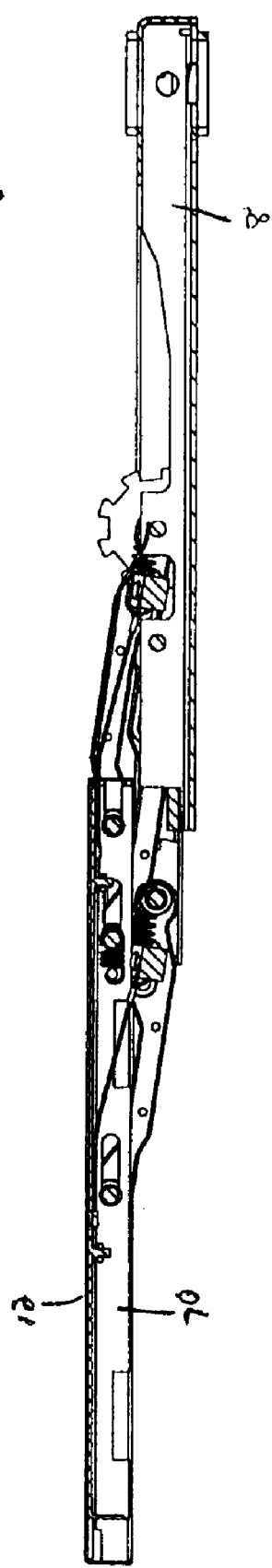

ELEVATABLE AND EXTENDABLE PLATFORM

TECHNICAL FIELD

This invention relates to an adjustable platform means, and more particularly, to a platform for securement to a motor vehicle to assist the entry or egress into the back of the vehicle, wherein the platform is easily and selectively extended or elevated, greatly increasing the versatility and utility.

BACKGROUND OF THE INVENTION

With the increasing popularity of sports utility vehicles and other trucks it has become desirable, and in some cases, necessary to have an auxiliary device for helping children, animals, the elderly and frail into or out of the vehicle. It is of course well known to have an auxiliary step such as often used on trains, however, this becomes somewhat problematic in that it must be stored when not in use, thereby reducing the amount of useful space within the vehicle. Numerous attempts have been made to resolve these problems, as well as the singular problem of loading things into and out of a pickup truck, both when the tailgate is up, as well as lowered.

Prior art known to the current inventors includes:

U.S. Pat. No. 3,580,613, granted to Northrop May 25, 1971, discloses a bumper having a trailer hitch mounted step, which can be unlatched and swung to a lower step position further from the truck body.

U.S. Pat. No. 3,758,134, granted to Stewart Sep. 11, 1973, discloses a breakaway step for high clearance vehicles adapted to be mounted to the frame beneath the front door of the cab.

U.S. Pat. No. 3,762,742, granted to Bucklen Oct. 2, 1973, discloses an electronically controlled step for vehicles, which is pivoted outwardly from a position beneath the side frame of the vehicle.

U.S. Pat. No. 3,961,809, granted to Clugston Jun. 8, 1976, discloses a safety step for vehicles and includes a step apparatus that is secured to the exterior of the tail gate and can be swung to form a step when the tail gate is lowered.

U.S. Pat. No. 3,981,515, granted to Roborough Sep. 21, 1976, discloses a step primarily utilized in earth moving equipment, wherein the step is swingable to a protected position to prevent damage.

U.S. Pat. No. 4,110,673, granted to Nagy et al Aug. 29, 1978, discloses a step structure for mobile homes or the like, wherein the step may be stored beneath the vehicle, but when desired is electronically extended outwardly from the side of the vehicle.

U.S. Pat. No. 4,312,515, granted to Allori Jan. 26, 1982, discloses a step, which is pivotable from a position beneath the vehicle to a position extending outwardly thereof, but requires that the step be vertically moved to accommodate the movement.

U.S. Pat. No. 4,369,984, granted to Hagen Jan. 25, 1983, discloses a extendable platform including a step movable outwardly from the side of a bus.

U.S. Pat. No. 4,524,475, granted to Valentino Jun. 25, 1985, discloses a hospital bed step, which may be clamped to the frame of the bed, is vertically adjustable and can be rotated to a position beneath the bed.

U.S. Pat. No. 5,897,125, granted to Bundy on Apr. 27, 1999, discloses a pivotable truck step that is operated against the locking force of a compression spring.

U.S. Pat. No. 5,738,362, granted to Ludwick on Apr. 14, 1998, discloses a rotating step for a trailer hitch, which must be moved in a vertical direction to rotate it from its stored position beneath the vehicle to its position extending outwardly thereof.

U.S. Pat. No. 6,149,172, granted to Pascoe et al on Nov. 21, 2000, discloses a modular power step, which rotates a step in a stored position to a deployed position.

U.S. Pat. No. 6,213,486 B1, granted to Kunz et al on Apr. 10, 2001, discloses a step assembly, which retracts into its own container and contains a concealed lower tread.

U.S. Pat. No. 6,325,397 B1, granted to Pascoe et al on Dec. 4, 2001, discloses an elongated modular running board, which is retractable to a position beneath the vehicle, the running board being supported by three pivot arms and driven by a single motor.

U.S. publication no. US2002/0125677 A1 in the name of Knodle and Bang, discloses a vehicle-mountable step that is mounted to the trailer hitch on the vehicle and is movable to a retracted position beneath the vehicle to an extended position outside the vehicle through the utilization of a single hand requiring no additional clearance.

Japanese patent no. 2-225151 discloses a variable step for a van type vehicle, wherein the actuation or motion of the sliding side door retracts or deploys the step.

SUMMARY OF THE INVENTION

With the above-noted prior art in mind, it is a feature of the present invention to provide a stable platform that is designed to be secured to a relatively fixed object and provide a platform that is adjustable both vertically and horizontally.

Another feature of the present invention is to provide a platform that may be quickly and easily secured to the trailer hitch hardware providing a step into the back of a vehicle and rotated to a stored position beneath the vehicle, and when extended, can be adjusted in vertical height and in horizontal location to accommodate a variety of needs, including when utilized on a pickup truck and the tailgate is extended.

Still another feature of the present invention is the fact that the platform may be moved from an extended to a retracted position, utilizing only one hand and further, may be adjusted in height and horizontal location, again using only one hand.

Yet another feature of the present invention includes the fact that the platform may be quickly and easily locked or unlocked in any one of a variety of usable positions.

BRIEF DESCRIPTION OF THE DRAWINGS

FIG. 9 is a bottom isometric view of the platform in its retracted position.

FIG. 10 is an isometric view showing the platform in its uppermost position.

FIG. 11 is a bottom isometric view showing the platform in its fully extended position.

FIG. 12 is a side elevational view of the platform in its retracted position.

FIG. 13 is a sectional view through FIG. 12 showing the invention in the retracted position.

FIG. 14 is a side elevation showing the platform in its upper most position.

FIG. 15 is a sectional view through FIG. 14.

FIG. 16 is a elevational view showing the platform in its extended position.

FIG. 17 is a sectional view through FIG. 16.

BEST MODE FOR CARRYING OUT THE INVENTION

Figure 1:
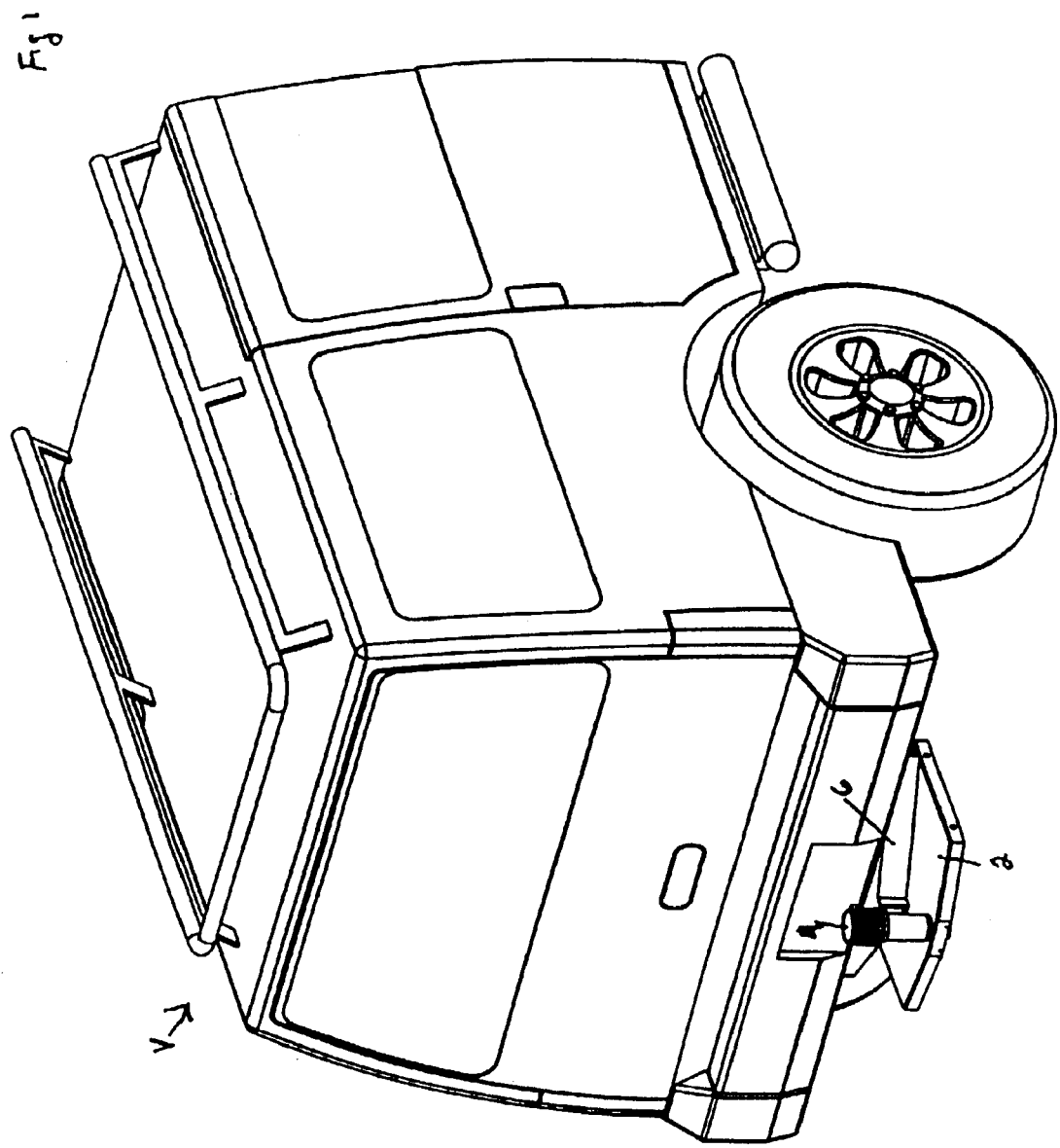
FIG. 1 is a view of a motor vehicle showing one utilization of the invention in the stowed position.
Figure 2:
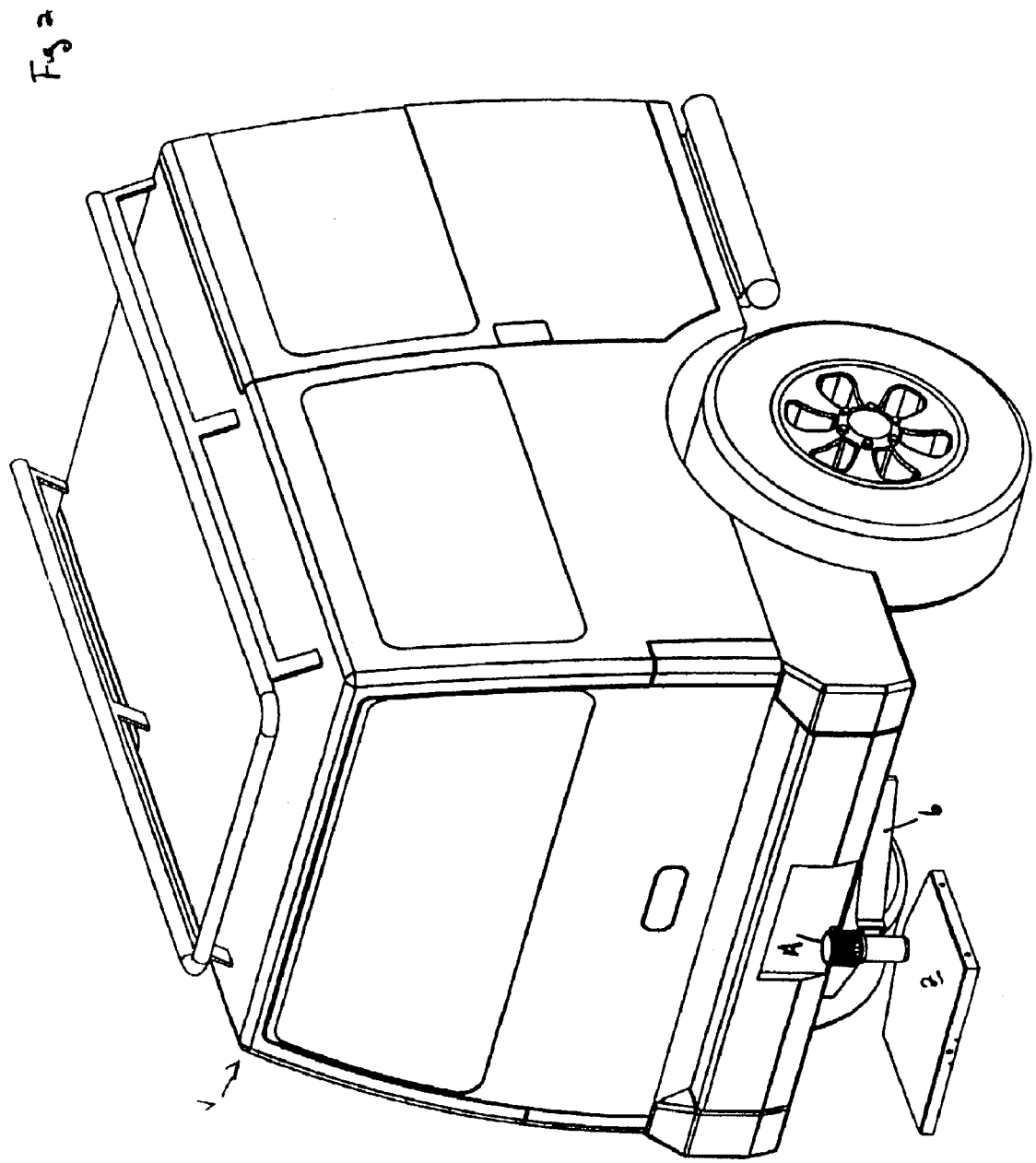
FIG. 2 is a similar view as FIG. 1 with the inventive platform in the deployed position.

As seen in FIGS. 1 and 2, which depict a motor vehicle V, including a stowable step 2, secured to a rotatable handle 4 added to a trailer hitch receiving structure 6, such that the rotation of the handle 4 will move the platform 2 from the position shown in FIG. 1 to the position shown in FIG. 2, allowing movement from the stowed position of FIG. 1 to the utilizable position of FIG. 2, and as fully described in U.S. patent application Ser. Nos. 09/802,286 and 10/289,887, both co-pending and having the same inventors as the present application.

Figure 3:
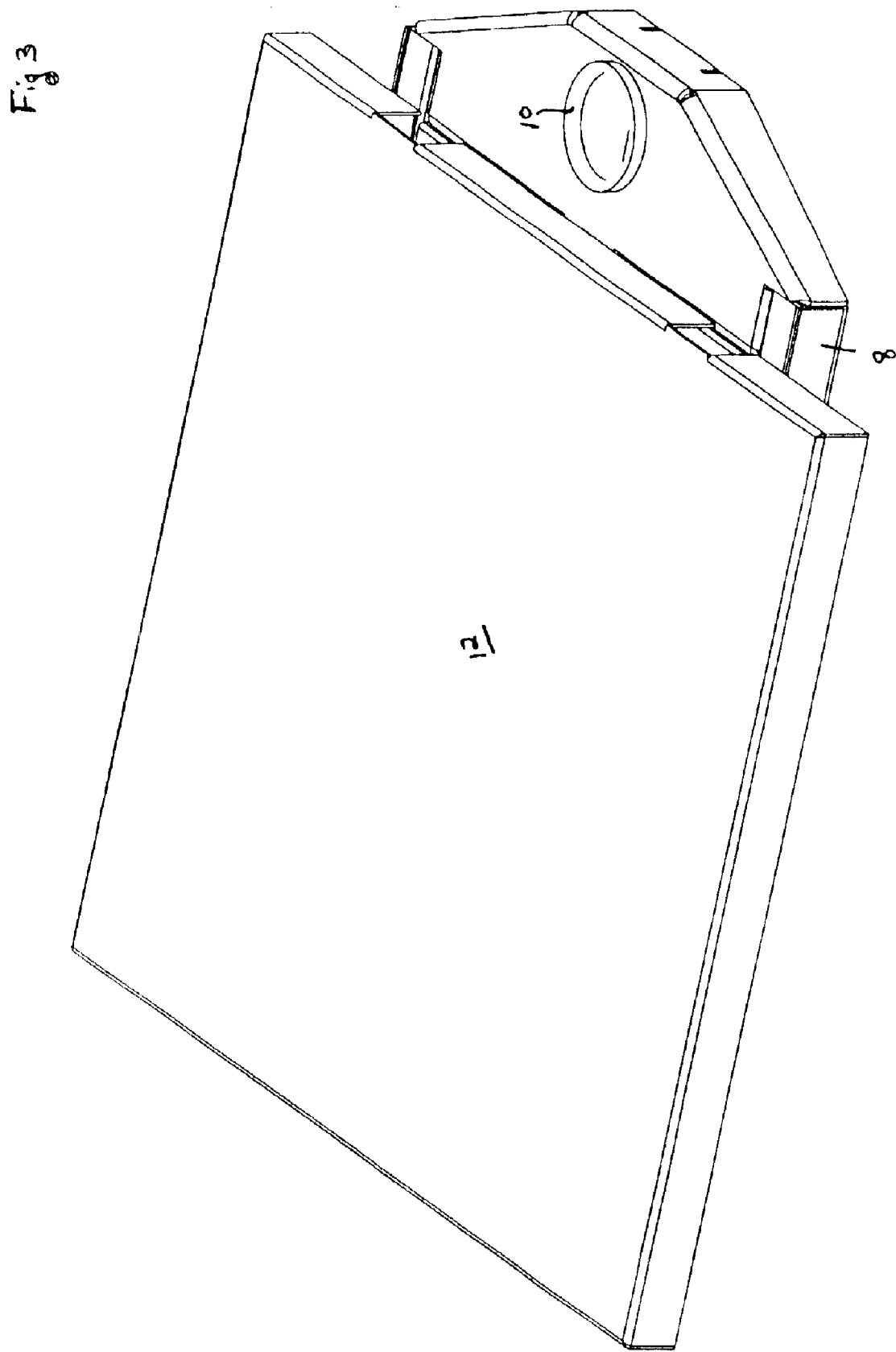
FIG. 3 is an enlarged isometric view of the inventive platform itself.

Reference is now had to FIG. 3 wherein an improved version of the platform is shown having a lower platform or framework including side members 8 including a bore 10 adapted to receive a vertical tube (not shown) as shown in the previously mentioned pending patent applications. An upper platform 12, which as described hereinafter, is movable to a position horizontally outwardly of the framework 8 or upwardly as shown.

Figure 4:
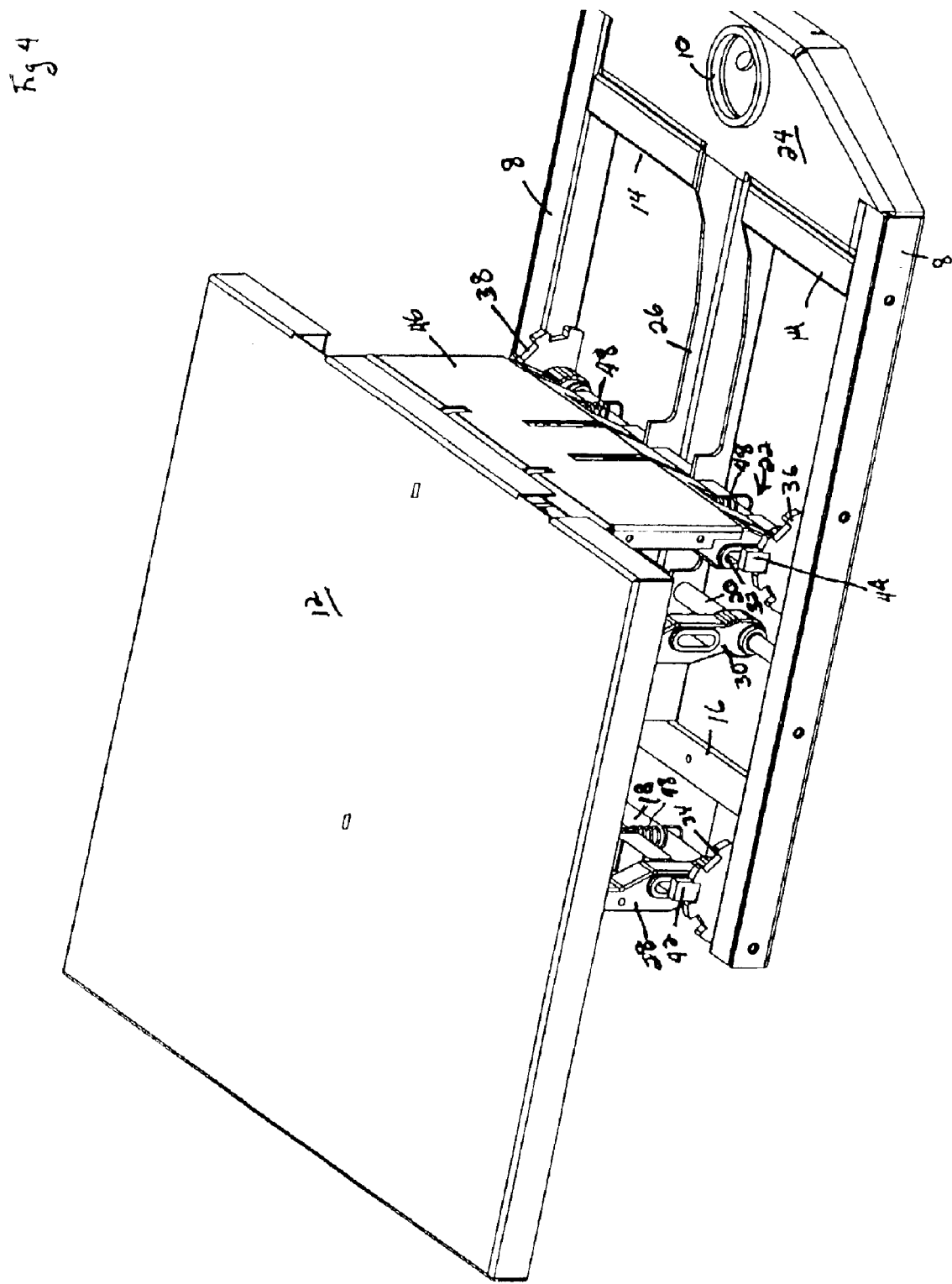
FIG. 4 is an isometric view of the current invention in the midpoint or highest position.

As seen in FIG. 4, the lower platform or unit is comprised of a pair of parallel side members 8, which combined with cross members 14,16 and axle members 18,20,22 form a rectangular unit closed at one end by a planar solid piece 24, which defines the opening 10. The platform or framework is likewise reinforced by a center spine 26. At each of the axles 18,20 and 22 pivotably mounted thereon parallel arm units 28,30 and 32, which as explained hereinafter, working in combination with half sprocket wheels 34,36,38 and 40 (not shown in this view) and retractable stops 42,44, which serve to lock the platform 12 in the desired position. Likewise in this view pivotably connected to parallel arm units 32 is shielding element 46, which follows the platform 12 and covers the operating mechanism when the platform is extended. Likewise seen in this view are a plurality of springs 48, which are utilized to selectively hold locking members 42,44 in the selected stops in the sprocket wheels 34,36,38 and 40.

Figure 5:
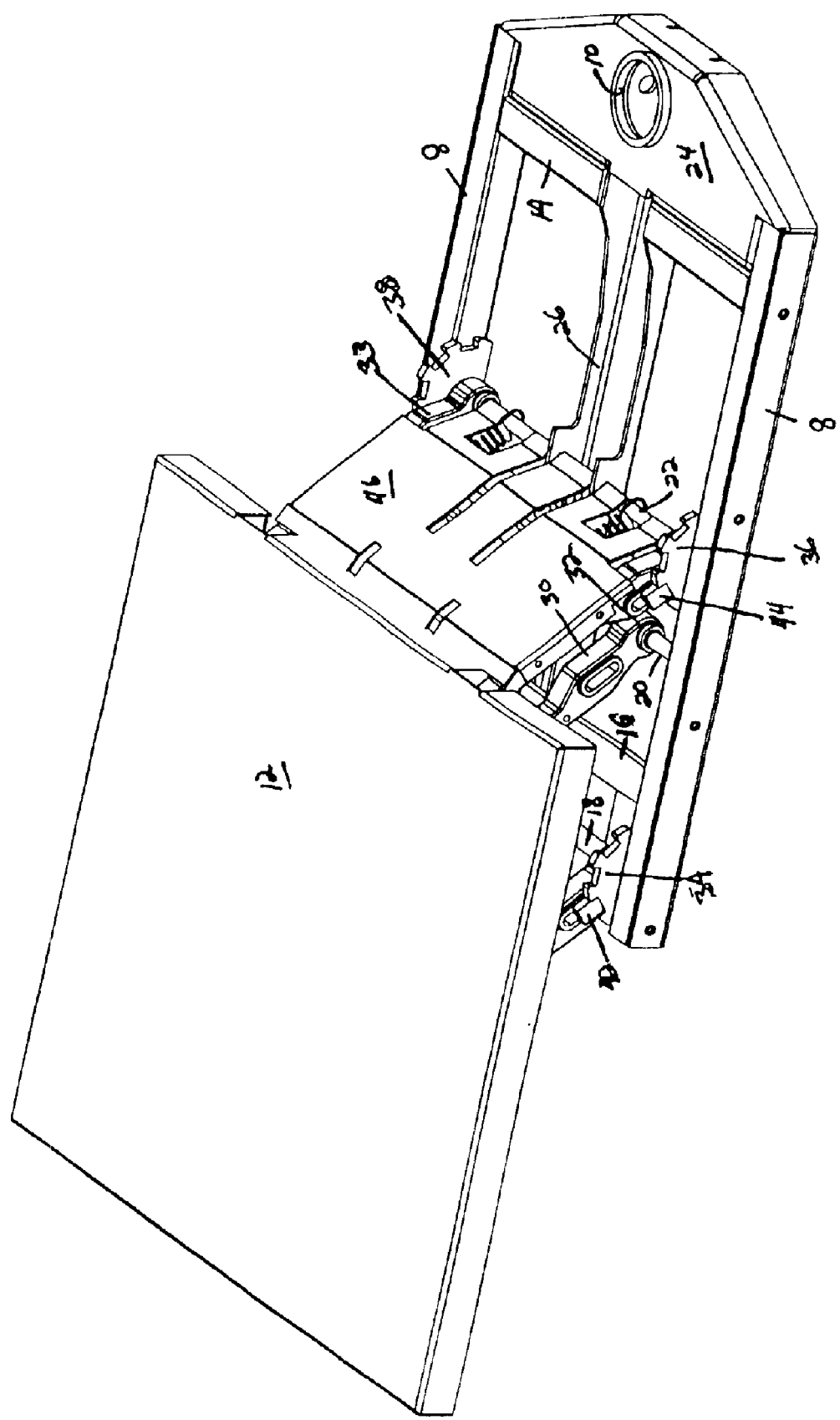
FIG. 5 is an isometric view of the present invention in an intermediate position.

As seen in FIG. 5, the platform has been moved to a position further outboard.

Figure 6:
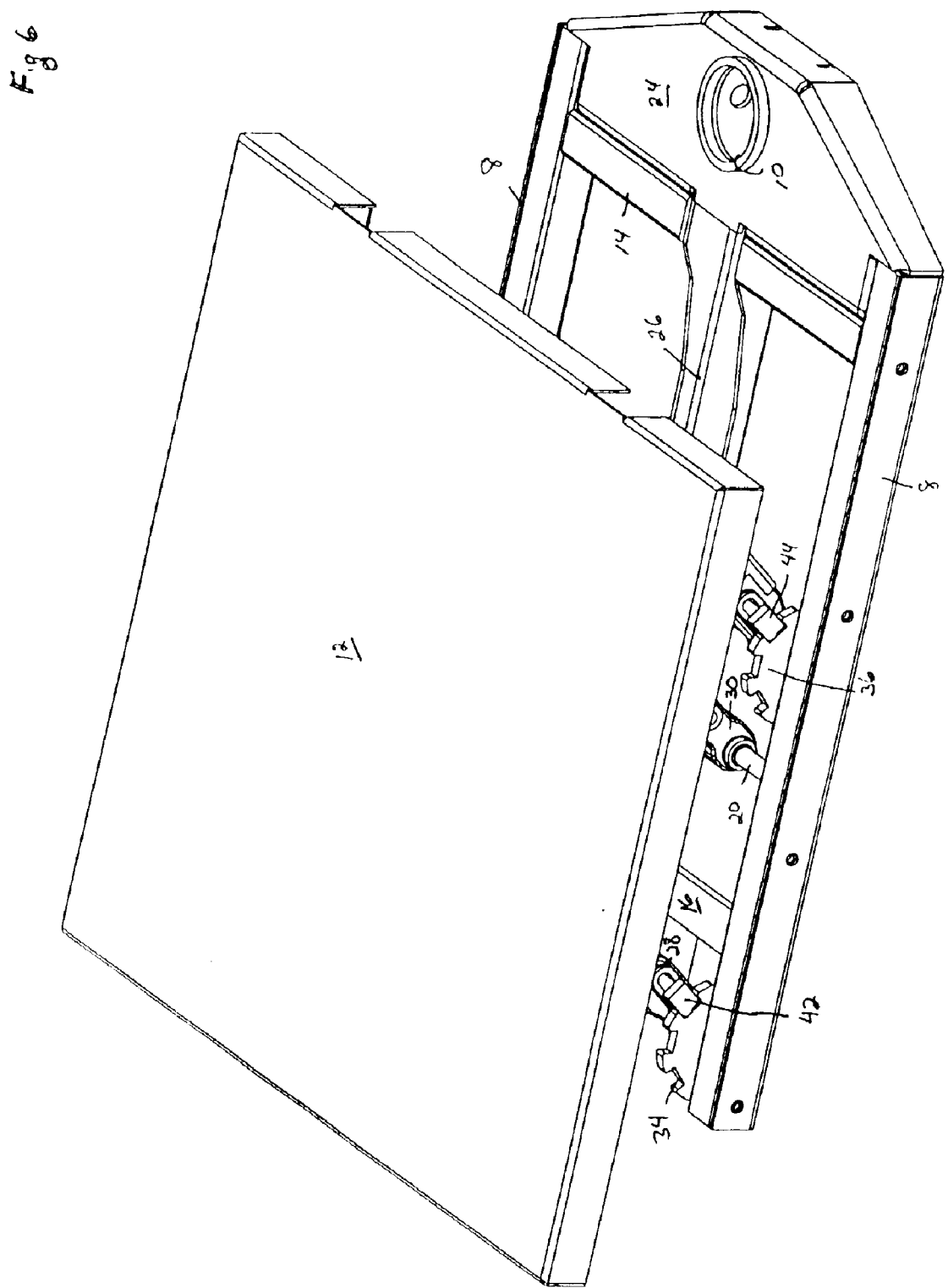
FIG. 6 is a top isometric view of the platform in its partially extended position.

FIG. 6 is the platform 12 in yet another locked position.

Figure 7:
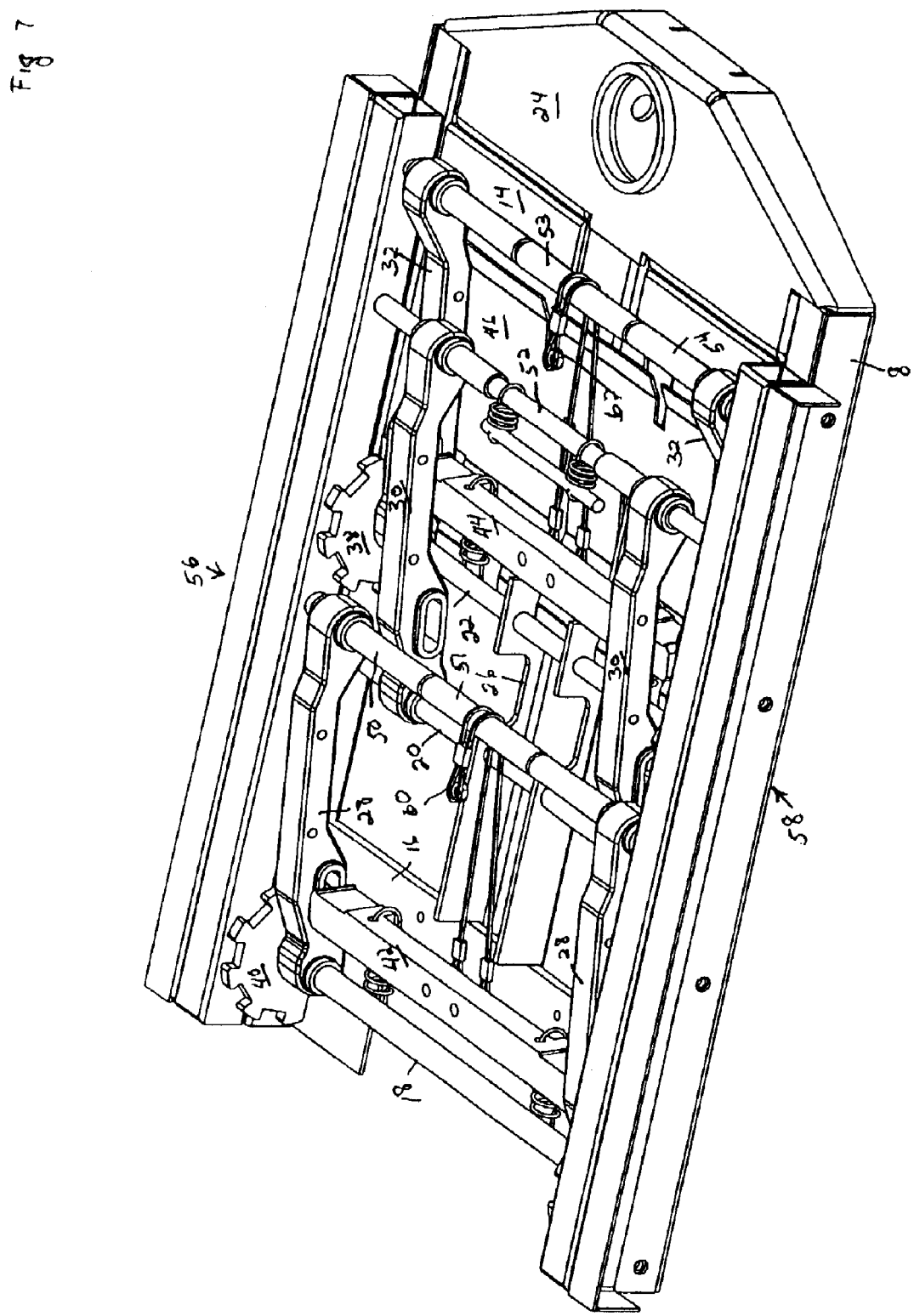
FIG. 7 is an isometric view from the top of the platform with its cover removed in its fully retracted position.

Reference is now had to FIG. 7, wherein the cover panel of platform 12 has been removed and the mechanism is in its retracted position. As seen in this view, the parallel arms 28, 30,32 include a second set of axles 50,52,54 at their outboard ends, which are pivotably mounted to parallel frame members 56, 58, which support and secure thereto platform member 12. Likewise seen in this figure are a pair of cable members 60,62, which are respectively secured to locking elements 42 and 44, and as explained hereinafter, are at their outer ends secured to a release mechanism, not shown in this view, selectively locking or releasing the locking elements 42,44.

Figure 8:
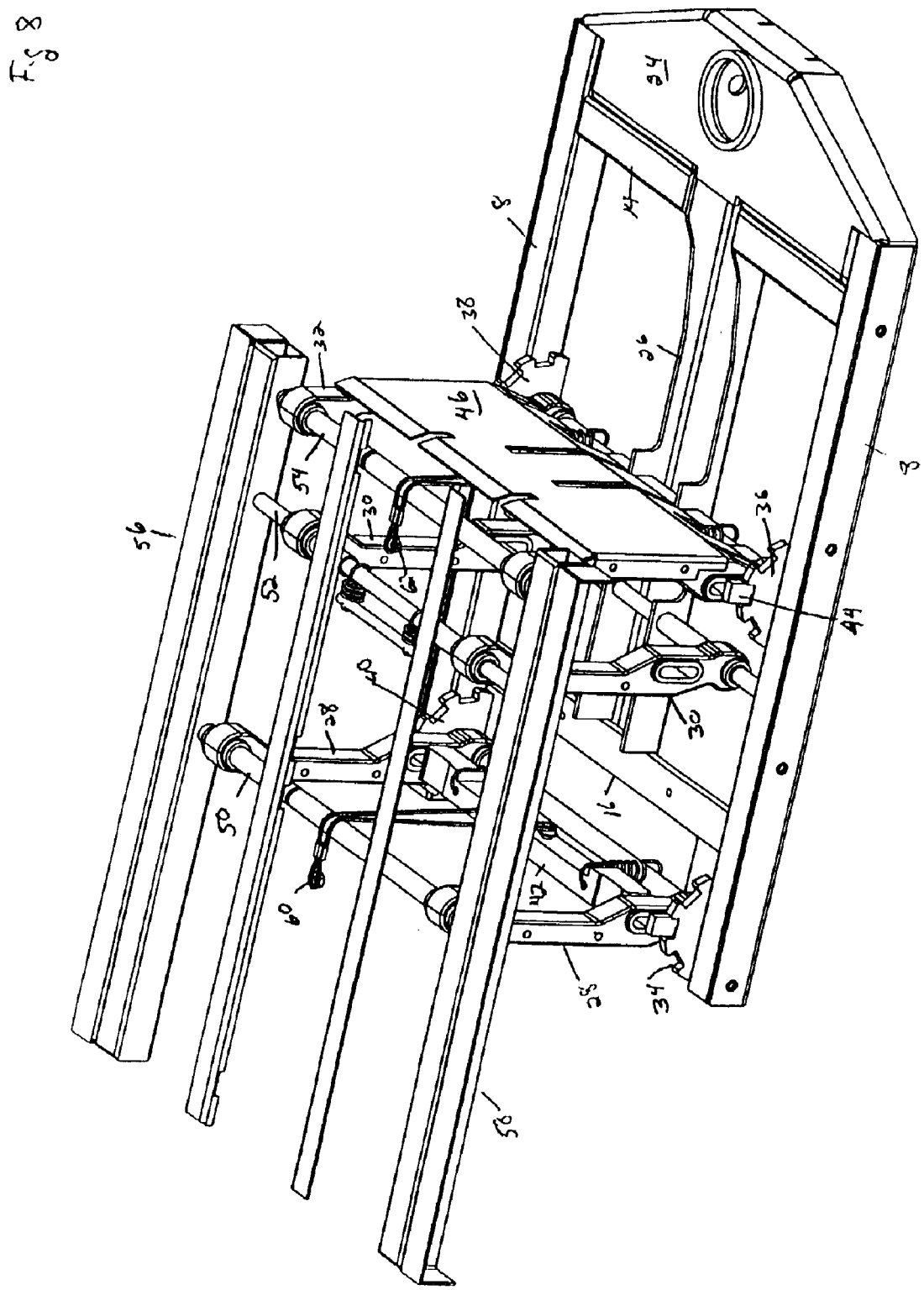
FIG. 8 is a top isometric view of the platform with the cover removed in the vertical displaced position.

For clarity the operating mechanism and framework minus the platform cover 12 are shown in a different position in FIG. 8.

Reference is now had to FIG. 9 showing the inventive unit is a perspective bottom view and closing the protective bottom panels 64, 66.

A bottom view with the platform raised to its highest position is depicted in FIG. 10, and it can be seen that the cables 60,62 secured to stop members 42,44 are likewise connected to fastening slide element 70, which is movable in a linear fashion against the tension of spring 72, which keeps it in its withdrawn position when slide 70 is moved in a linear direction toward the outermost end of platform 12, cables 60,62 move locking elements 42,44 out of their axis allowing the platform 12 to be moved to another selective position. Sleeves 51,53 reduce friction between the cables and the axles.

The remainder of the figures are illustrative of the various positions from various viewpoints to better illustrate the inter relationship of the parts which are identically numbered in the various figures.

As can be seen the present invention improves the platform by allowing it to be moved to a position approximately 6 inches higher than the position when stowed to a secured location, as well as approximately 18 inches further away from the securement point and does so while including a plurality of intermediate sturdy locked positions and the device is entirely operable with one hand.

What is claimed is:

1. A horizontally extendable self-supporting platform adapted to be removably secured to a relatively stable support, comprising:

a first, relatively horizontal platform member rigidly secured to the support; and a second relatively horizontal platform member rigidly secured to and overlying the first platform member, said second platform member movable from a first position overlying the first platform member to a second position extending beyond the first platform member in substantially the same plane as the first position, the second platform member maintaining the same orientation while moving from the first to the second position; and said first and second platform members joined by pivotable pairs of parallel rigid linking members secured at each end to the respective platform members.

2. A horizontally extendable self-supporting platform as in claim 1, wherein the second platform member is securable at positions intermediate the first and second positions.

3. A horizontally extendable self-supporting platform as in claim 2, wherein the second platform member is rigid and secure at all of the positions.

4. A horizontally extendable self-supporting platform as in claim 2, wherein the platform may be locked or unlocked in each of its discrete positions using only one hand.

5. A horizontally extendable self-supporting platform as in claim 1, wherein the extendable platform is adapted to be secured to a motor vehicle.

6. A horizontally extendable self-supporting platform as in claim 5, wherein the platform is secured to the vehicle such that it pivots from a stowed position beneath the vehicle to a deployed position extending outwardly therefrom.

7. A horizontally extendable self-supporting platform as in claim 1, wherein the frame members are joined by three pair of pivotable parallel rigid linking members.

* * * * *